United States Patent
MacKenzie

(12) 
(10) Patent No.: US 6,444,286 B1
(45) Date of Patent: Sep. 3, 2002

(54) RETENTION BARRIER SYSTEM

(76) Inventor: William J. MacKenzie, 6014 Mountain Lake Rd., Lakeland, FL (US) 33813

( * ) Notice: Subject to any disclaimer, the term of this patent is extended or adjusted under 35 U.S.C. 154(b) by 37 days.

(21) Appl. No.: 09/613,793

(22) Filed: Jul. 11, 2000

(51) Int. Cl.[7] ............................. B32B 3/06; B32B 3/12; E04B 1/62; E04B 1/74; E04D 15/00
(52) U.S. Cl. ..................... 428/99; 428/114; 428/119; 428/188; 428/292.7; 428/902; 52/404.3; 52/404.5; 52/742.12; 52/749.1
(58) Field of Search ................. 428/114, 119, 428/99, 166, 188, 464, 292.7, 902; 442/366; 52/404.3, 404.5, 749.1, 749.12

(56) References Cited

U.S. PATENT DOCUMENTS

| | | | | |
|---|---|---|---|---|
| 4,199,636 A | * | 4/1980 | Clark | 428/114 |
| 4,280,312 A | * | 7/1981 | Otts | 52/749 |
| 4,704,312 A | * | 11/1987 | Butcher | 428/12 |

* cited by examiner

Primary Examiner—Shrive P. Beck
Assistant Examiner—Elena Tsoy

(57) ABSTRACT

A retention barrier system comprises a flexible laminate of a thin paper sheet and thin aluminum sheet in a rectangular configuration. The laminate has a leading edge and a parallel trailing edge and side edges between the leading and trailing edges. A plurality of flexible rods are positioned across, and coupled to, the laminate from side edge to side edge and spaced from each other along the length of the laminate.

9 Claims, 4 Drawing Sheets

RETENTION BARRIER SYSTEM

BACKGROUND OF THE INVENTION

1. Field of the Invention

The present invention relates to a retention barrier system and more particularly pertains to providing thermal insulation by installing a paper-aluminum laminate from a roll to the space adjacent ceiling rafters.

2. Description of the Prior Art

The use of retention barriers of known designs and configurations is known in the prior art. More specifically, retention barriers of known designs and configurations previously devised and utilized for the purpose of installing insulation through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,047,345 to Alderman discloses a roof system. U.S. Pat. No. 4,303,713 to Clemson discloses a roof insulation structure and method of making same. U.S. Pat. No. 4,707,961 to Nunley discloses a composite roof/roof deck assembly with polymeric membrane. U.S. Pat. No. 4,391,075 to Musgrave discloses an insulated roof structure. U.S. Pat. No. 4,726,985 to Fay discloses a reflective fibrous insulation. U.S. Pat. No. 5,433,050 to Wilson discloses a vented insulation panel with foamed spacer members. U.S. Pat. No. 5,495,698 to Alderman discloses a roofing method and apparatus. U.S. Pat. No. 5,918,436 to Adlerman discloses a radiant barrier facing material.

While these devices fulfill their respective, particular objectives and requirements, the aforementioned patents do not describe a retention barrier system that allows providing thermal insulation by installing a paper-aluminum laminate from a roll to the space adjacent ceiling rafters.

In this respect, the retention barrier system according to the present invention substantially departs from the conventional concepts and designs of the prior art, and in doing so provides an apparatus primarily developed for the purpose of providing thermal insulation by installing a paper-aluminum laminate from a roll to the space adjacent ceiling rafters.

Therefore, it can be appreciated that there exists a continuing need for a new and improved retention barrier system which can be used for providing thermal insulation by installing a paper-aluminum laminate from a roll to the space adjacent ceiling rafters. In this regard, the present invention substantially fulfills this need.

SUMMARY OF THE INVENTION

In view of the foregoing disadvantages inherent in the known types of retention barriers of known designs and configurations now present in the prior art, the present invention provides an improved retention barrier system. As such, the general purpose of the present invention, which will be described subsequently in greater detail, is to provide a new and improved retention barrier system and method which has all the advantages of the prior art and none of the disadvantages.

To attain this, the present invention essentially comprises a retention barrier system for thermal insulation to facilitate the installation of a paper-aluminum laminate from a roll to the space between adjacent ceiling rafters. First provided is a flexible laminate. The flexible laminate is comprised of a thin paper sheet and thin aluminum sheet in a rectangular configuration. The laminate has a leading edge and a parallel trailing edge. The laminate also has long parallel side edges between the parallel leading and trailing edges. The paper and aluminum sheets each have an upper surface and a lower surface. The lower surface of the paper sheet overlies the upper surface of the aluminum sheet. The paper and aluminum sheets are of a common size. The leading and trailing and side edges of the paper and aluminum sheets are mutually contiguous. A plurality of flexible rods are next provided. The flexible rods are positioned across the lower surface of the aluminum sheet from side edge to side edge. The flexible rods are spaced from each other along the length of the laminate by a longitudinal distance of about 12 inches. The length of each rod is essentially equal to the distance between the side edges and constitutes a lateral distance slightly greater than the lateral distance between adjacent rafters. The length of each rod is selected from the space including 18 inches, 24 inches and 30 inches. Next provided is a strip of adhesive tape. The strip overlies each rod and the adjacent lower surface of the aluminum sheet. A generally rigid core is next provided. The core receives the trailing edge of the laminate. The remainder of the laminate is wound around the core. An end of the laminate remains free. The free end is exposed for positioning between adjacent rafters.

Next provided is a first positioning tool. The first positioning tool has a distal end and a proximal end. The first positioning tool also has an intermediate extent between the distal end and the proximal end. The distal end of the first positioning tool includes a c-shaped holder secured through a hinge to the intermediate extent for positioning the leading edge of the laminate at the lower end of rafters during installation. The proximal end of the first positioning tool constitutes a handle for being grasped by the user. The intermediate extent of the first positioning tool is of an extended length whereby a user may position laminate from an extended distance. Lastly provided is a second positioning tool. The second positioning tool has a distal end and a proximal end. The second positioning tool also has an intermediate extent between the distal end and the proximal end. The distal end of the second positioning tool includes a c-shaped holder secured to the intermediate extent for securement to the upper end of rafters during installation. The proximal end of the second positioning tool has a hinge with a shaft secured thereto for supporting a roll of laminate. There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retention barrier system which has all of the advantages of the prior art retention barriers of known designs and configurations and none of the disadvantages.

It is another object of the present invention to provide a new and improved retention barrier system which may be easily and efficiently manufactured and marketed.

It is further object of the present invention to provide a new and improved retention barrier system which is of durable and reliable constructions.

An even further object of the present invention is to provide a new and improved retention barrier system which is susceptible of a low cost of manufacture with regard to both materials and labor, and which accordingly is then susceptible of low prices of sale to the consuming public, thereby making such retention barrier system economically available to the buying public.

Even still another object of the present invention is to provide a retention barrier system for providing thermal insulation by installing a paper-aluminum laminate from a roll to the space adjacent ceiling rafters.

Lastly, it is an object of the present invention to provide a new and improved retention barrier system comprising a flexible laminate of a thin paper sheet and thin aluminum sheet in a rectangular configuration. The laminate has a leading edge and a parallel trailing edge and side edges between the leading and trailing edges. A plurality of flexible rods are positioned across, and coupled to, the laminate from side edge to side edge and spaced from each other along the length of the laminate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
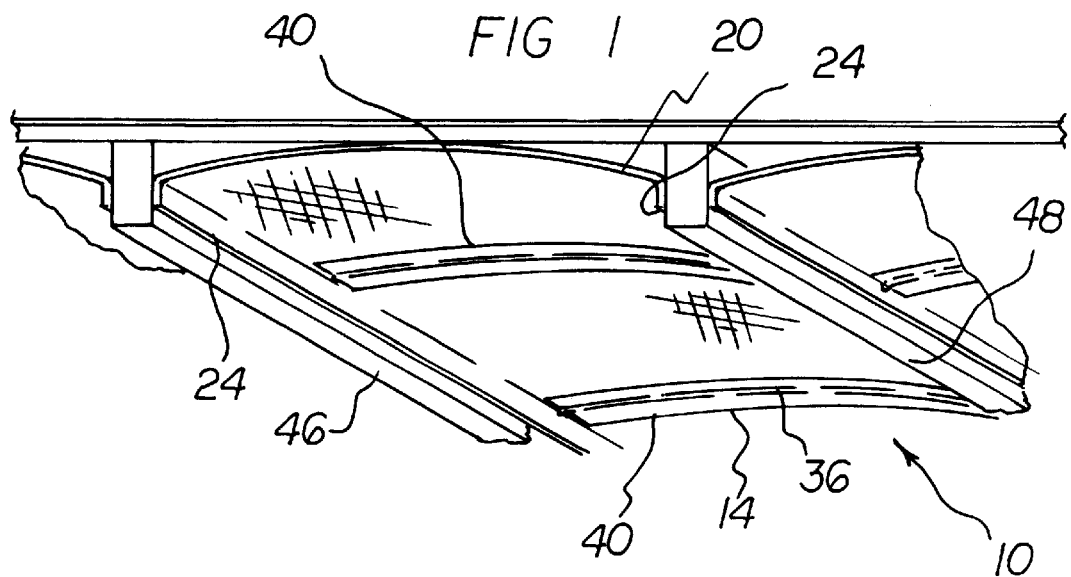
FIG. 1 is a perspective illustration of the new and improved retention barrier system constructed in accordance with the principles of the present invention.
Figure 2:
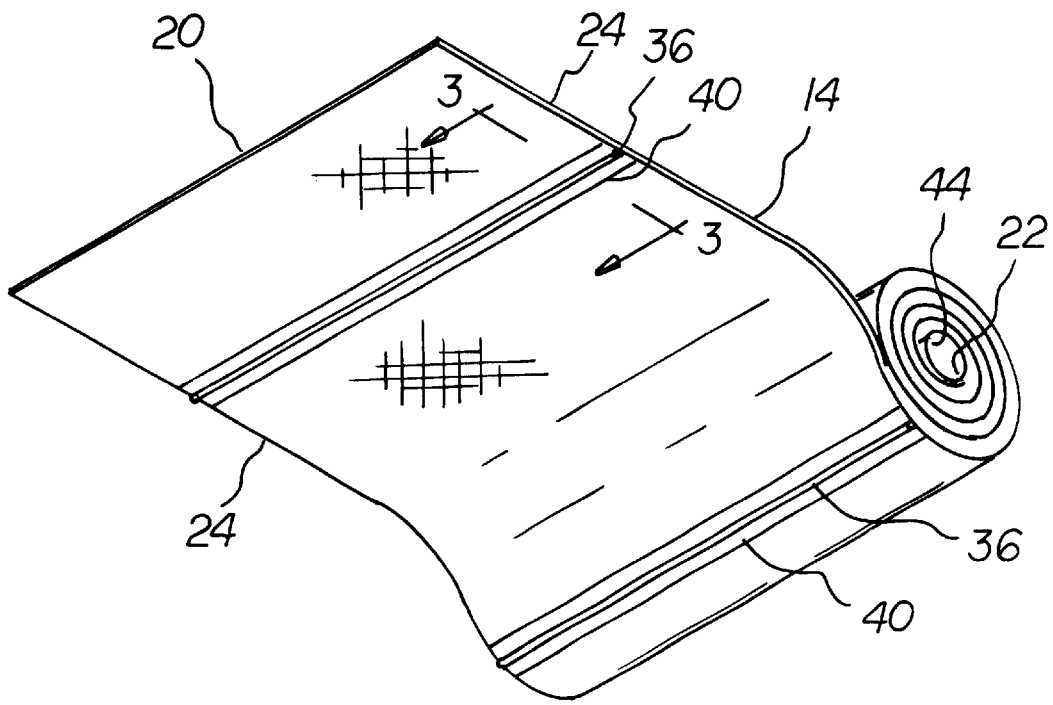
FIG. 2 is an enlarged perspective showing of the insulation shown in FIG. 1.
Figure 3:
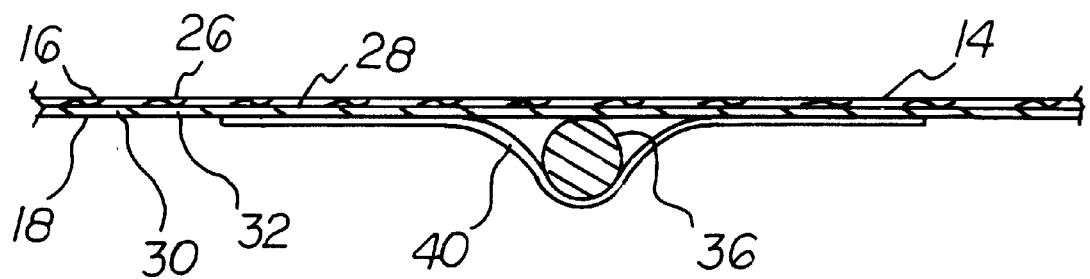
FIG. 3 is a cross sectional view taken along line 3—3 of FIG. 2.

With reference now to the drawings, and in particular to FIG. 1 thereof, the preferred embodiment of the new and improved retention barrier system embodying the principles and concepts of the present invention and generally designated by the reference numeral 10 will be described.

The present invention, the retention barrier system 10 for thermal insulation to facilitate the installation of a paper-aluminum laminate from a roll to the space between adjacent ceiling rafters is comprised of a plurality of components. Such components in their broadest context include a flexible laminate and a plurality of flexible rods. Such components are individually configured and correlated with respect to each other so as to attain the desired objective.

First provided is a flexible laminate 14. The flexible laminate is comprised of a thin paper sheet 16 and thin aluminum sheet 18 in a rectangular configuration. The laminate has a leading edge 20 and a parallel trailing edge 22. The laminate also has long parallel side edges 24 between the parallel leading and trailing edges. The paper and aluminum sheets each have an upper surface 26, 28 and a lower surface 30, 32. The lower surface of the paper sheet overlies the upper surface of the aluminum sheet. The paper and aluminum sheets are of a common size. The leading and trailing and side edges of the paper and aluminum sheets are mutually contiguous.

A plurality of flexible rods 36 are next provided. The flexible rods are positioned across the lower surface of the aluminum sheet from side edge to side edge. The flexible rods are spaced from each other along the length of the laminate by a longitudinal distance of about 12 inches. The length of each rod is essentially equal to the distance between the side edges and constitutes a lateral distance slightly greater than the lateral distance between adjacent rafters. The length of each rod is selected from the space including 18 inches, 24 inches and 30 inches. The rods take an upwardly bending configuration between rafters with the ends of the rods in bending contact with the rafters for a secure positioning of the rods and the laminate.

Next provided is a strip 40 of adhesive tape. The strip overlies each rod and the adjacent lower surface of the aluminum sheet.

A generally rigid core 44 is next provided. The core receives the trailing edge of the laminate. The remainder of the laminate is wound around the core. An end of the laminate remains free. The free end is exposed for positioning between adjacent rafters 46, 48.

Next provided is a first positioning tool 52. The first positioning tool has a distal end 54 and a proximal end 56. The first positioning tool also has an intermediate extent 58 between the distal end and the proximal end. The distal end of the first positioning tool includes a c-shaped holder 60 secured through a hinge 62 to the intermediate extent for positioning the leading edge of the laminate at the lower end 64 of rafters during installation. The proximal end of the first positioning tool constitutes a handle for being grasped by the user. The intermediate extent of the first positioning tool is of an extended length whereby a user may position laminate from an extended distance.

Lastly provided is a second positioning tool 66. The second positioning tool has a distal end 68 and a proximal end 70. The second positioning tool also has an intermediate extent 72 between the distal end and the proximal end. The distal end of the second positioning tool includes a c-shaped holder 74 secured to the intermediate extent for securement to the upper end 76 of rafters during installation. The proximal end of the second positioning tool has a hinge 78 with a shaft secured thereto for supporting a roll of laminate.

During operation and use of the tools, the leading edge of the laminate is positioned at the lower end of the rafters by the first tool. The roll of laminate is then positioned on the upper end of the rafters by the second tool. With both ends of the laminate secured, the first tool is released from the laminate as through a release button. Thereafter, the first tool is used to push the intermediate portions of the laminate into operative position between the rafters.

Figure 4:
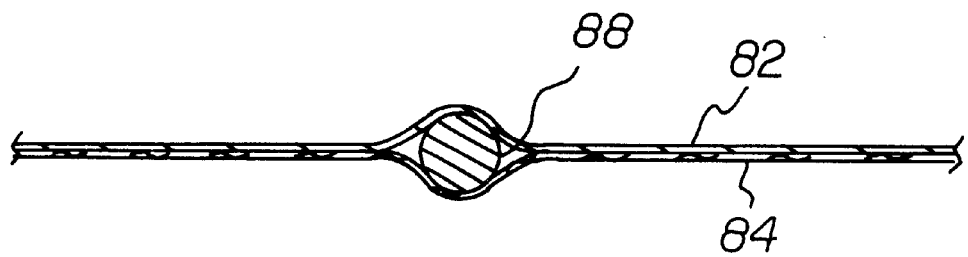
FIG. 4 is a cross sectional view similar to FIG. 3 but showing an alternate embodiment of the invention.

An alternate embodiment of the invention is shown in FIG. 4. In this embodiment, the paper and aluminum sheets each have an upper surface 82 and a lower surface 84. In this embodiment the lower surface 82 of the aluminum sheet overlies the upper surface 84 of the paper sheet. In this embodiment the rods 88 are secured between the aluminum sheet and the paper sheet.

Figure 5:
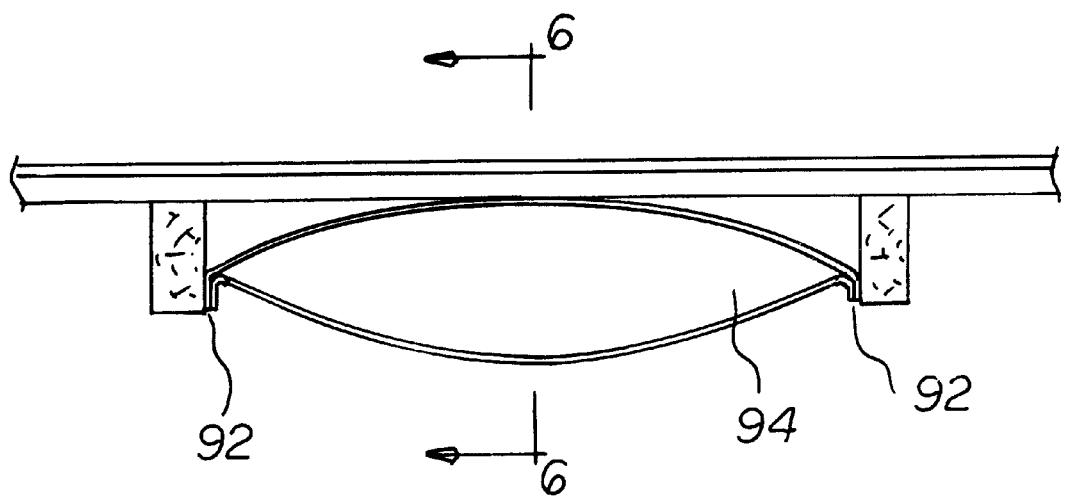
FIG. 5 is a cross sectional view of yet a further alternate embodiment of the invention.
Figure 6:
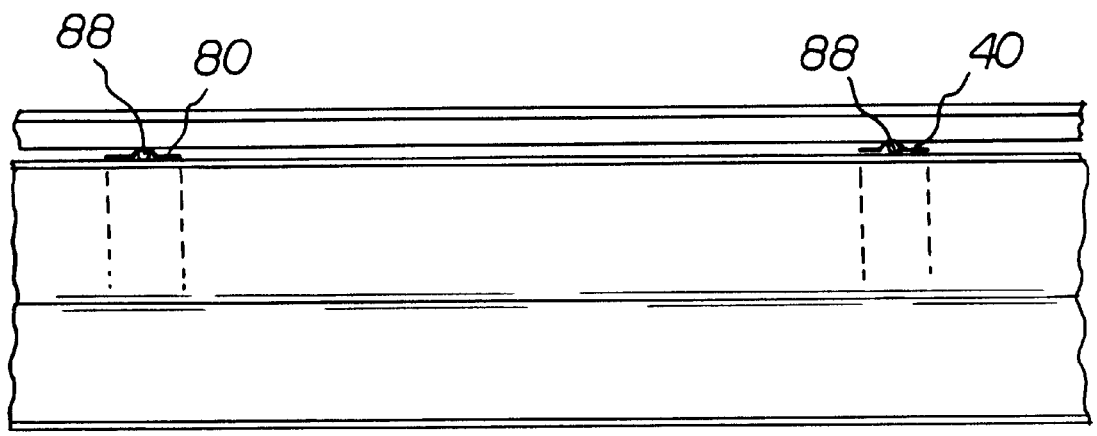
FIG. 6 is a cross sectional view taken along line 6—6 of FIG. 5.
Figure 7:
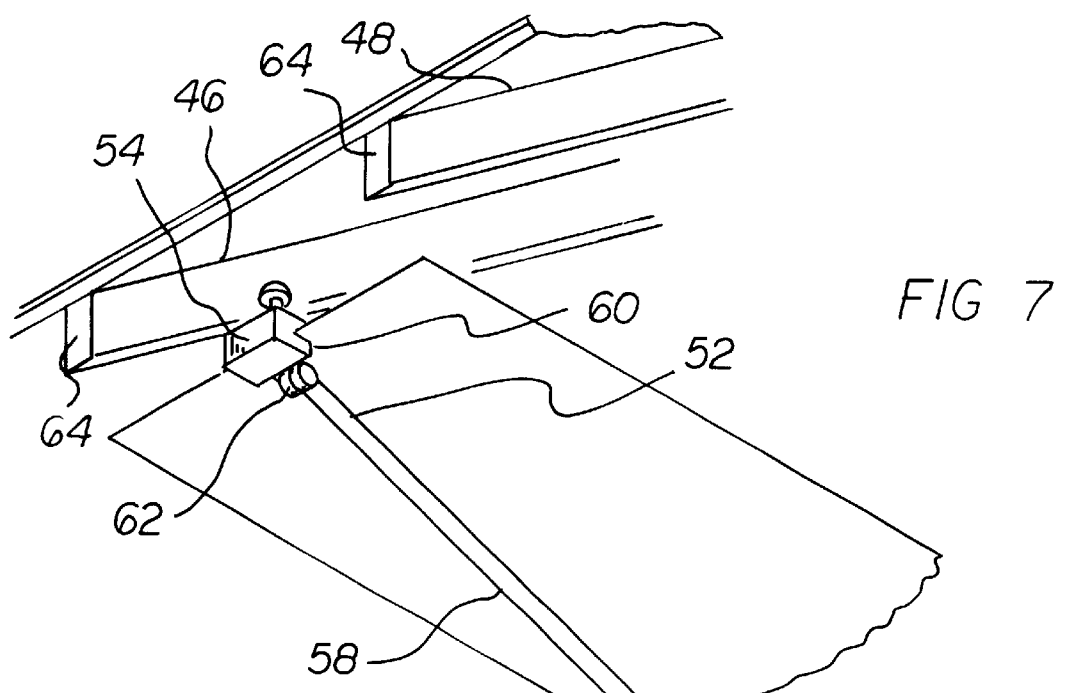
FIG. 7 is a perspective illustration of the first positioning tool in operation and use.
Figure 8:
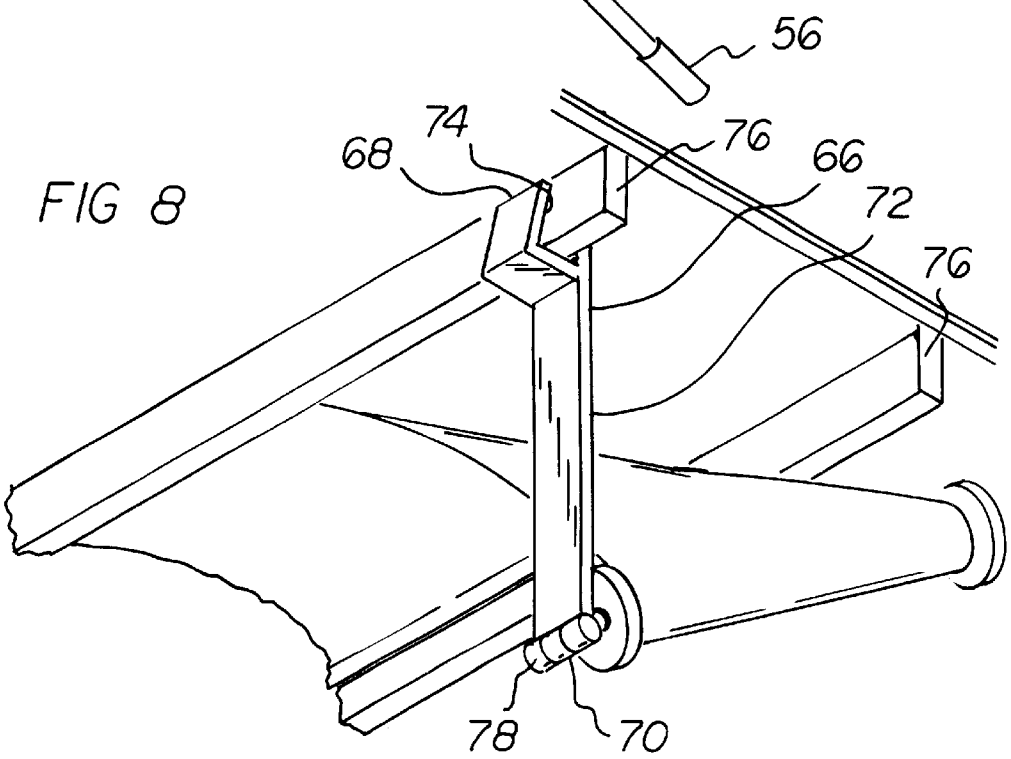
FIG. 8 is a perspective illustration of the second positioning tool in operation and use.

A final embodiment of the invention is shown in FIGS. 5 and 6. In this final embodiment, the paper sheet and the aluminum sheets are coupled together only along their edges as by an adhesive 92. In this embodiment a space 94 is allowed to form between the sheets during use. In this final embodiment the rods are coupled to the upper surface of the top-most sheet by an adhesive tape.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retention barrier system for thermal insulation to facilitate the installation of a paper-aluminum laminate from a roll to the space between adjacent ceiling rafters comprising, in combination;

a flexible laminate of a paper sheet and aluminum sheet in a rectangular configuration having a leading edge and a parallel trailing edge and having long parallel side edges there between, the paper and aluminum sheets each having an upper surface and a lower surface with the lower surface of the paper sheet overlying the upper surface of the aluminum sheet, the paper and aluminum sheets being of a common size with their leading and trailing and side edges mutually contiguous;

a plurality of flexible rods positioned across the lower surface of the aluminum sheet from side edge to side edge and spaced from each other along the length of the laminate by a longitudinal distance of about 12 inches, the length of each rod being essentially equal to the distance between the side edges and constituting a lateral distance slightly greater than the lateral distance between adjacent rafters and selected from the space including 18 inches, 24 inches and 30 inches;

a strip of adhesive tape overlying each rod and the adjacent lower surface of the aluminum sheet;

a rigid core receiving the trailing edge of the laminate with the remainder of the laminate wound there around and with the free end of the laminate exposed for positioning between adjacent rafters;

a first positioning tool having a distal end and a proximal end with an intermediate extent there between, the distal end including a c-shaped holder secured through a hinge to the intermediate extent for positioning the leading edge of the laminate at the lower end of rafters during installation, the proximal end constituting a handle for being grasped by the user, and the intermediate extent being of an extended length whereby the user may position laminate from an extended distance; and a second positioning tool having a distal end and a proximal end with an intermediate extent there between, the distal end including a c-shaped holder secured to the intermediate extent for securement to the upper end of rafters during installation, and the proximal end having a hinge with a shaft secured thereto for supporting a roll of laminate.

2. A retention barrier insulating system comprising:

adjacent rafters having a space there between at a fixed distance;

a flexible laminate of a paper sheet and aluminum sheet in a rectangular configuration having a leading edge and a parallel trailing edge and side edges there between; and a plurality of flexible rods positioned across, and coupled to the laminate from side edge to side edge and spaced from each other along the length of the laminate, the length of each rod being essentially equal to the distance between the side edges of the laminate and greater than the fixed distance between adjacent rafters.

3. The system as set forth in claim 2 wherein the paper and aluminum sheets each has an upper surface and a lower surface with the lower surface of the paper sheet overlying the upper surface of the aluminum sheet.

4. The system as set forth in claim 2 wherein the rods are positioned beneath the laminate and secured thereto by adhesive tape.

5. The system as set forth in claim 2 wherein the paper and aluminum sheets each has an upper surface and a lower surface with the lower surface of the aluminum sheet overlying the upper surface of the paper sheet.

6. The system as set forth in claim 2 wherein the rods are secured between the aluminum sheet and the paper sheet.

7. The system as set forth in claim 2 wherein the paper sheet and the aluminum sheet are coupled together only along their edges by an adhesive thereby allowing a space to form between the sheets during use and with the rods coupled to the upper surface of the top-most sheet by an adhesive tape.

8. The system as set forth in claim 2 and further including a first positioning tool having a distal end and a proximal end with an intermediate extent there between, the distal end including a c-shaped holder secured through a hinge to the intermediate extent for positioning the leading edge of the laminate at the lower end of rafters during installation, the proximal end constituting a handle for being grasped by the user, and the intermediate extent being of an extended length whereby the user may position laminate from an extended distance.

9. The system as set forth in claim 8 and further including a second positioning tool having a distal end and a proximal end with an intermediate extent there between, the distal end including a c-shaped holder secured to the intermediate extent for securement to the upper end of rafters during installation, and the proximal end having a hinge with a shaft secured thereto for supporting a roll of laminate.

\* \* \* \* \*